Figure 1:
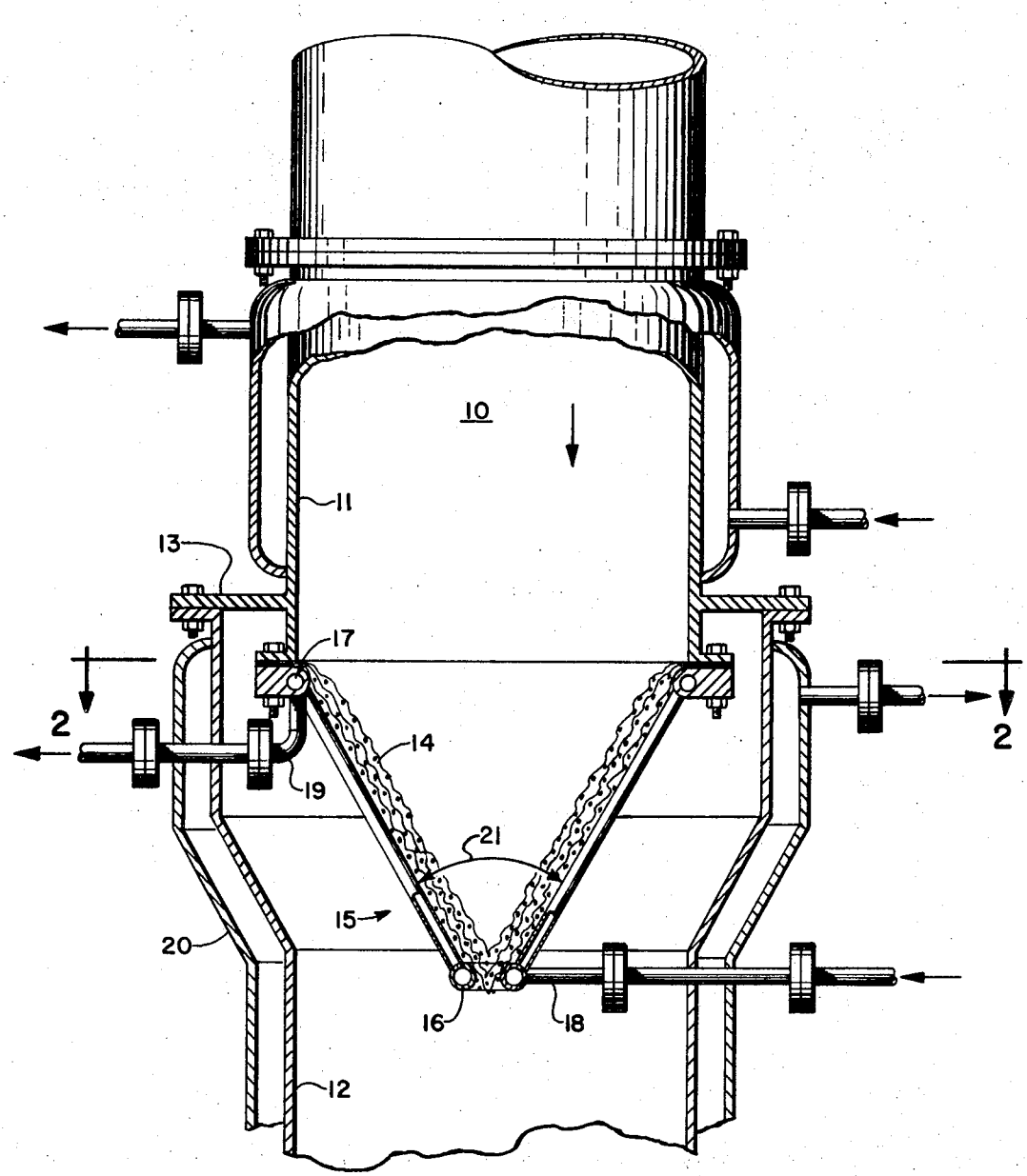

United States Patent [19]
Strelzoff

[11] 3,715,193
[45] Feb. 6, 1973

[54] CATALYST SUPPORT

[76] Inventor: Samuel Strelzoff, 12 West 96th Street, New York, N.Y. 10025

[22] Filed: March 1, 1971

[21] Appl. No.: 119,670

[52] U.S. Cl. ............23/288 R, 23/288 H, 23/288 K, 165/169, 165/175, 165/183, 252/477 R, 423/376, 423/403
[51] Int. Cl..........B01j 9/04, C01b 21/28, F28f 1/00
[58] Field of Search..23/288 R, 288 H, 288 J, 288 K, 23/289, 151, 162, 1 B, 1 E; 252/477 R; 165/169, 175, 183, 157

[56] References Cited

UNITED STATES PATENTS 3,326,281   6/1967   Law......................................165/169
2,584,080   1/1952   Houpt..................................23/288 J
1,270,989   7/1918   Taliani................................23/288 K
2,750,266   6/1956   Roberts et al.......................23/288 R
2,620,262   12/1952  Hujsak et al.......................165/175 X

*Primary Examiner*—Joseph Scovronek
*Attorney*—Donald L. Johnson, John F. Sieberth and Shelton B. McAnelly

[57] ABSTRACT

A support for a metallic gauze catalyst in a reactor for manufacturing hydrocyanic acid or nitrogen oxides is made up of a plurality of hollow tubular members disposed in a conical configuration. Heat transfer media flows within the hollow tubular members which make up the conical support to maintain a more uniform temperature of the catalyst and permit the use of less costly materials for catalyst support structures.

3 Claims, 2 Drawing Figures

CATALYST SUPPORT

BACKGROUND OF THE INVENTION

1. Field of the Invention

The invention relates to the manufacture of hydrocyanic acid and nitrogen oxides from ammonia and air or oxygen by the combustion thereof in the presence of a suitable noble metal catalyst, methane being fed also for the production of hydrocyanic acid. In particular, the invention relates to reactor configurations and structures for supporting the catalyst to achieve long life of catalyst and long uninterrupted operation of the reactor system.

2. Description of the Prior Art

Conical shaped catalytic gauze structures for the manufacture of hydrocyanic acid and oxides of nitrogen are disclosed in U. S. Pat. Nos. 2,496,999 and 2,552,279 which discuss at length several problems involved in the process. One of the serious problems of the prior art is that of physical failure or breaking of the catalyst gauze, usually attributed as in U. S. Pat. Nos. 3,033,658 and 3,215,495, to embrittlement associated with a deposition of carbon in the cooler regions of the catalyst gauze. Although the conical catalyst structure of the prior art represents a significant improvement in increasing the production capacity of a given diameter of reactor, mechanical failure of the catalyst is still experienced at an undesirably high rate in conical gauze systems, apparently largely because the benefits of the smaller diameter of the reactor are offset to some extent by the greater mass of catalyst that is required for a given diameter in the conical configuration and the greater stresses produced in the gauze due to the weight and angularity of the catalyst. Thus the present invention includes an aspect related to the provision of supports for the conical catalyst gauze to minimize stresses due to the weight that must be supported directly and solely by the gauze itself.

Supported catalysts in general are not new inasmuch as they are described in other prior art, such as U. S. Pat. Nos. 2,750,266; 3,056,655 and 3,423,185; however, a problem with the structures of these patents is that the support systems that have been used are complex and are not conveniently usable in conjunction with a conical shaped catalyst.

The present invention seeks to provide a thermally regulated support for a conical gauze catalyst system useful in the production of hydrocyanic acid and nitrogen oxides.

In accordance with the present invention a support is provided for a conical shaped metallic gauze catalyst in a reactor used for the manufacture of hydrocyanic acid or oxides of nitrogen by reaction of ammonia and air or oxygen to produce oxides of nitrogen, and ammonia, air or oxygen and a hydrocarbon gas to produce hydrocyanic acid. The catalyst support comprises a conical spoked assembly containing a plurality of hollow tubular members connected to a gas distributor section at the apex of the cone and to a gas collector section at the base of the cone, and means for supplying a heat transfer fluid to the distributor and removing it at the collector whereby the catalyst is cooled by the heat transfer fluid by a greater amount in the region of the apex than in the region of the base of the cone.

The present invention also relates to a gas flowthrough reactor utilizing the aforesaid catalyst support wherein the base to apex axis of the cone is substantially parallel to the flow of gases through the reactor and wherein the base of the cone is nearer the feed point of the gases than the apex of the cone and wherein the gauze catalyst is disposed on the support on the side thereof which is first contacted by gases flowing through the reactor.

In a typical example of the use of the aforesaid catalyst support, ammonia, air and a hydrocarbon are reacted in the presence of a platinum containing gauze catalyst to produce hydrocyanic acid.

With reference now to FIG. 1 of the drawing, the apparatus shown therein includes a cylindrical reactor 10 having upper and lower portions 11 and 12, respectively. Each reactor section is jacketed for heat control purposes, the upper jacket generally being provided with heating through the jacket whereas the lower section is generally provided with cooling through the jacket. The flow through the reactor 10 is generally in a downward direction indicated in FIG. 1 by the arrow near the reference character 10. The two reactor sections are connected together as by flange 13 providing for convenient assembly and disassembly. The upper reactor section 11 preferably extends downward beyond the flange 13 to minimize undesirable heat losses through the flange and attendant abrupt temperature gradients.

A conically configured catalyst structure is disposed within the reactor as indicated in general by reference character 14. The catalyst structure is a plural layer mesh of platinum, platinum and rhodium alloy and similar mesh materials. As combustible gases flow through the reactor in the direction indicated by the arrow, combustion occurs in the region of passage of the gases through the catalyst gauze 14 whereby desired combustion products are produced. In the case where hydrocyanic acid is desired, the principal constituents of the gases fed include ammonia, oxygen or air and a hydrocarbon such as methane. In the case where it is desired to produce nitrogen oxides for nitric acid, the feed gases to the reactor are essentially ammonia and oxygen or air. In the case of HCN the usual temperature of the catalyst gauze is at from about 1,800° to about 2,400°F, preferably 2,000°–2,200°F, typically 2,100°F. In the case of nitric oxides the temperature is from about 1,650° to about 1,700°F.

The catalyst gauze is supported by a conical spoke support structure indicated generally by reference character 15 having a lower annular distributor 16 and upper circular collector 17. The "spokes" of the support are typically six in number equidistantly spaced or distributed around the cone. Each of the spokes of the support 15 is hollow to provide for the circulation of a heat control fluid therethrough. The support is cast or fabricated in one or more portions and assembled if necessary. Typically, such heat control or heat transfer fluid is steam, water, or molten salt or metal supplied through line 18 connected to distributor 16 and removed through line 19 connected to collector 17. The heat transfer fluid provides for several desirable results. In the first place, the cooling desirably maintains the catalyst support at a sufficiently low temperature to avoid exceeding melting point, creep points or yield points of the materials of construction used. The flow arrangement through the support thus provides for cooling the apex portion of the catalyst structure and for heating the peripheral portion of the catalyst structure near the attachment point thereof to the upper portion 11 of the reactor. It is understood that although the term "heating" has been used with respect to the peripheral portion of the catalyst that in many instances the effect in that region is also cooling; however, relatively speaking, the cooling effect is more pronounced in the apex region of the catalyst, minimizing "cold" operation of the periphery of the catalyst which some authorities suggest is at least partly responsible for breakage of the catalyst in prior art systems. The angle 21 of the catalyst and support is from about 30° to about 120°, typically 60°.

It is readily seen from the foregoing discussion that the support 15 not only avoids the necessity for the catalyst to support its entire physical weight but that it also provides for control of the temperature of the catalyst facilitating operation and warmup of the system on starting or in brief interruptions of feed during which time heated heat transfer medium is supplied through line 18 to provide heating of the catalyst to minimize thermal shock to the catalyst.

The materials of construction problem is of considerable importance in the apparatus of the present invention, a characteristic of the art. Typically, the materials of construction used for the catalyst support 15 must be capable of withstanding the temperatures encountered in operation including momentary upsets and also they must be capable of resisting corrosion or attack by the materials present in the environment. Additionally, the catalyst supports must not be of such composition as would tend to impair the catalytic effect of the catalyst due to poisoning or other action. In some instances a preferred catalyst support structure is of metal with ceramic coating. Preferably, the materials of construction for the various portions of the catalyst support are stainless steels such as SS–304 ELC, SS–316, SS–317, particularly stainless steels containing 2 to 4 percent molybdenum. Such materials are less costly than other materials required in the prior art such as Inconel, HK 40, and Carborundum; however, even these are improved through the use of the principles of the present invention.

Figure 2:
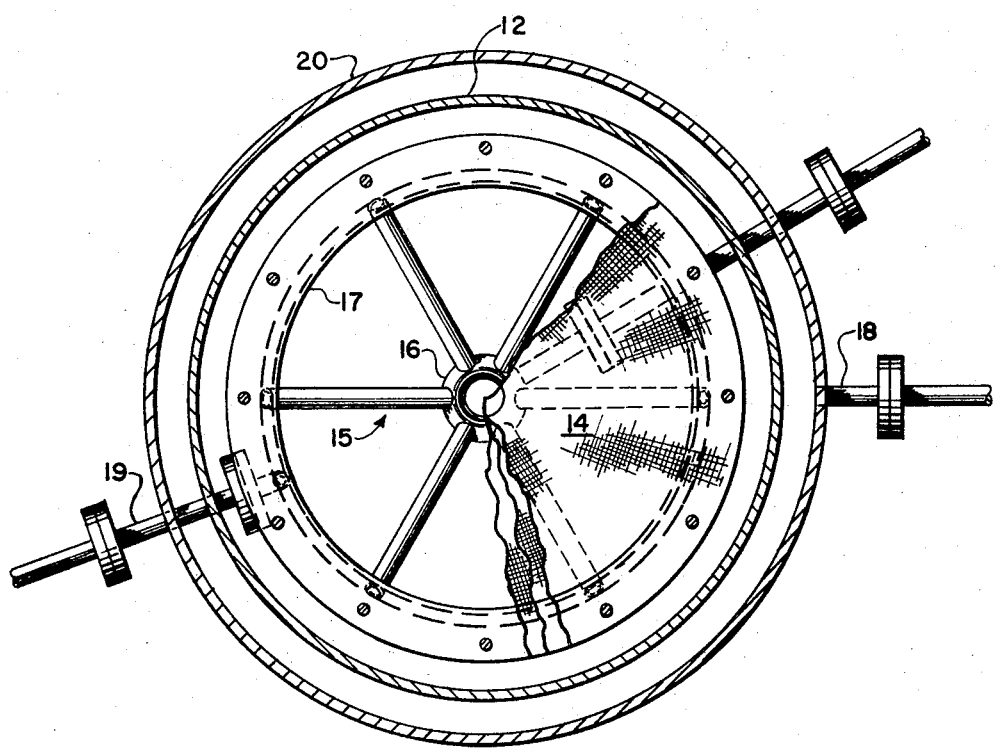

With reference now to FIG. 2 of the drawing, another view of the reactor 10 of FIG. 1 is shown in a partially cut-away cross-section. Corresponding reference characters are used to indicate principally the structure of the catalyst support; viz., the support 15, annular distributor 16, circular collector 17, the upper extension of the lower portion 12 of the reactor, and its jacket 20. As indicated in FIG. 2, the catalyst support typified contains six "spoke" members; however, it is to be understood that in appropriate instances greater or lesser numbers of spokes such as eight, 10, 12 or four may be useful or desirable. As is seen from FIG. 2, the "spokes" connect to the annular distributor 16 and also to a conduit portion within the collector 17 whereby the heat transfer fluid passing through the spokes is placed in contact with the entire supporting periphery for the catalyst 14 to maintain heat input thereto by means other than through the catalyst itself. As has been discussed, such is desired to minimize the cooling effect upon the catalyst.

EXAMPLE

A cylindrical reactor is made as in FIG. 1 having an internal diameter (10) of 4 feet. The catalyst support is fabricated by welding from SS–304 using six tubes of 2 inches outside diameter with ¼ inch wall thickness. The angle 21 is 60°.

The catalyst is 90 percent platinum, 10 percent rhodium, 52 mesh, 0.004 inch wire screen placed in seven layers, formed from triangular sheets welded together with a hydrogen torch.

The reactor is fed by a mixture of gas, air and ammonia in proportions of about 2,500 pounds per hour of ammonia, 63 thousand standard cubic feed per hour of natural gas and 327 thousand standard cubic feed per hour of air. The feed mixture is preheated to a temperature of 450°F. The catalyst temperature is 2,000°–2,200°F. Saturated steam at about 150 psig is supplied through line 18 to the annular distributor 16 of the catalyst support.

In operation from 50 to 65 percent of the ammonia is converted to HCN, 10–15 percent is decomposed and the balanced recovered by reaction with sulfuric acid to produce ammonium sulfate.

I claim:

1. A support for a conical shaped metallic gauze catalyst in a reactor used for the manufacture of hydrocyanic acid or oxides of nitrogen by reaction of ammonia and air or oxygen to produce oxides of nitrogen and ammonia, air or oxygen and a hydrocarbon gas to produce hydrocyanic acid, which comprises, a conical spoked assembly containing a plurality of hollow tubular members connected to a fluid distributor section at the apex of the cone and to a fluid collector section at the base of the cone, and means for supplying a heat transfer fluid to the distributor and means for removing it at the collector whereby the catalyst is cooled by the heat transfer fluid by a greater amount in the region of the apex than in the region of the base of the cone.

2. A gas flowthrough reactor utilizing the catalyst support of claim 1 wherein the base to apex axis of the cone is substantially parallel to the flow of gases through the reactor and wherein the base of the cone is nearer the feed point of the gases than the apex of the cone and wherein the gauze catalyst is disposed on the support on the side thereof which is first contacted by gases flowing through the reactor.

3. The support in accordance with claim 1 comprising in addition a conical shaped platinum containing gauze catalyst supported by the conical spoked assembly.

* * * * *